US012428157B2

(12) United States Patent
McGreevy et al.

(10) Patent No.: US 12,428,157 B2
(45) Date of Patent: Sep. 30, 2025

(54) PASSENGER SEATING WITH FRONT ROW BULKHEAD INTEGRATION

(71) Applicant: Thompson Aero Seating Limited, Craigavon (GB)

(72) Inventors: Jonathan McGreevy, Camlough (GB); Robert Elliott, Craigavon (GB)

(73) Assignee: Thompson Aero Seating Limited, Craigavon (GB)

( * ) Notice: Subject to any disclaimer, the term of this patent is extended or adjusted under 35 U.S.C. 154(b) by 0 days.

(21) Appl. No.: 17/854,725

(22) Filed: Jun. 30, 2022

(65) Prior Publication Data
US 2023/0002057 A1    Jan. 5, 2023

(30) Foreign Application Priority Data

Jul. 2, 2021    (GB) ...................................... 2109582

(51) Int. Cl.
*B64D 11/06*  (2006.01)
*B64D 11/00*  (2006.01)

(52) U.S. Cl.
CPC ...... *B64D 11/0601* (2014.12); *B64D 11/0015* (2013.01); *B64D 11/0641* (2014.12); *B64D 11/0643* (2014.12)

(58) Field of Classification Search
CPC ............ B64D 11/0601; B64D 11/0602; B64D 11/0604; B64D 11/0606; B64D 11/0619; B64D 11/06205; B64D 11/0015; B64D 11/0643; B64D 11/06; B64D 11/00; B64C 1/10; B60N 2/42; B60N 2/00; B60N 2/48; B60N 2/02; B60R 21/13; B60R 21/20; A47C 7/02; A47C 7/38
See application file for complete search history.

(56) References Cited

U.S. PATENT DOCUMENTS 5,340,059 A *  8/1994  Kanigowski ........... B64D 25/00
                                                            280/752
5,482,230 A *  1/1996  Bird ......................... B64C 1/10
                                                            244/121
(Continued)

FOREIGN PATENT DOCUMENTS

EP          3263444 A1     1/2018
WO       2014/014780 A2    1/2014
(Continued)

OTHER PUBLICATIONS

European Search Report of European Application No. 22181215 mailed on Oct. 25, 2022.

*Primary Examiner* — Joshua J Michener
*Assistant Examiner* — Cindi M Curry
(74) *Attorney, Agent, or Firm* — Barclay Damon LLP

(57) ABSTRACT

A passenger seating installation for a vehicle comprises a front seat located adjacent a bulkhead and facing in a direction that is oblique to the direction of travel of the vehicle. The bulkhead includes a recess for receiving the head of a passenger in the front seat in the event of an accident. The recess is spaced apart from the front seat in the direction of travel and in a direction that is obliquely disposed with respect to the direction in which the seated passenger faces. The recess allows the front seat to be located closer to the bulkhead than would be the case in the absence of the recess, which can increase seat density in a seating area.

17 Claims, 6 Drawing Sheets

(56) References Cited

U.S. PATENT DOCUMENTS

| | | | | |
|---|---|---|---|---|
| 5,992,798 | A * | 11/1999 | Ferry | A47C 1/0352 |
| | | | | 105/316 |
| 9,821,913 | B1 * | 11/2017 | Deevey | B64D 11/06205 |
| 9,919,800 | B2 * | 3/2018 | Cailleteau | B64D 11/06 |
| 11,142,320 | B2 * | 10/2021 | Lee | B64D 11/0604 |
| 2017/0008632 | A1 | 1/2017 | Eberle et al. | |
| 2017/0203847 | A1 * | 7/2017 | Browning | B64D 11/0619 |
| 2018/0201375 | A1 | 7/2018 | Browning et al. | |
| 2019/0118926 | A1 * | 4/2019 | Tiryaki | B64C 1/069 |
| 2019/0248497 | A1 * | 8/2019 | Ersan | B64D 11/0602 |
| 2019/0315467 | A1 * | 10/2019 | Nicholas | B64D 11/0602 |
| 2020/0062403 | A1 * | 2/2020 | Williams | B64D 11/0602 |
| 2022/0332425 | A1 * | 10/2022 | Jérôme | B64D 11/0641 |
| 2023/0286655 | A1 * | 9/2023 | Collins | B64D 11/0641 |

FOREIGN PATENT DOCUMENTS

| | | |
|---|---|---|
| WO | 2016/098088 A1 | 6/2016 |
| WO | 2018/078377 A1 | 5/2018 |

* cited by examiner

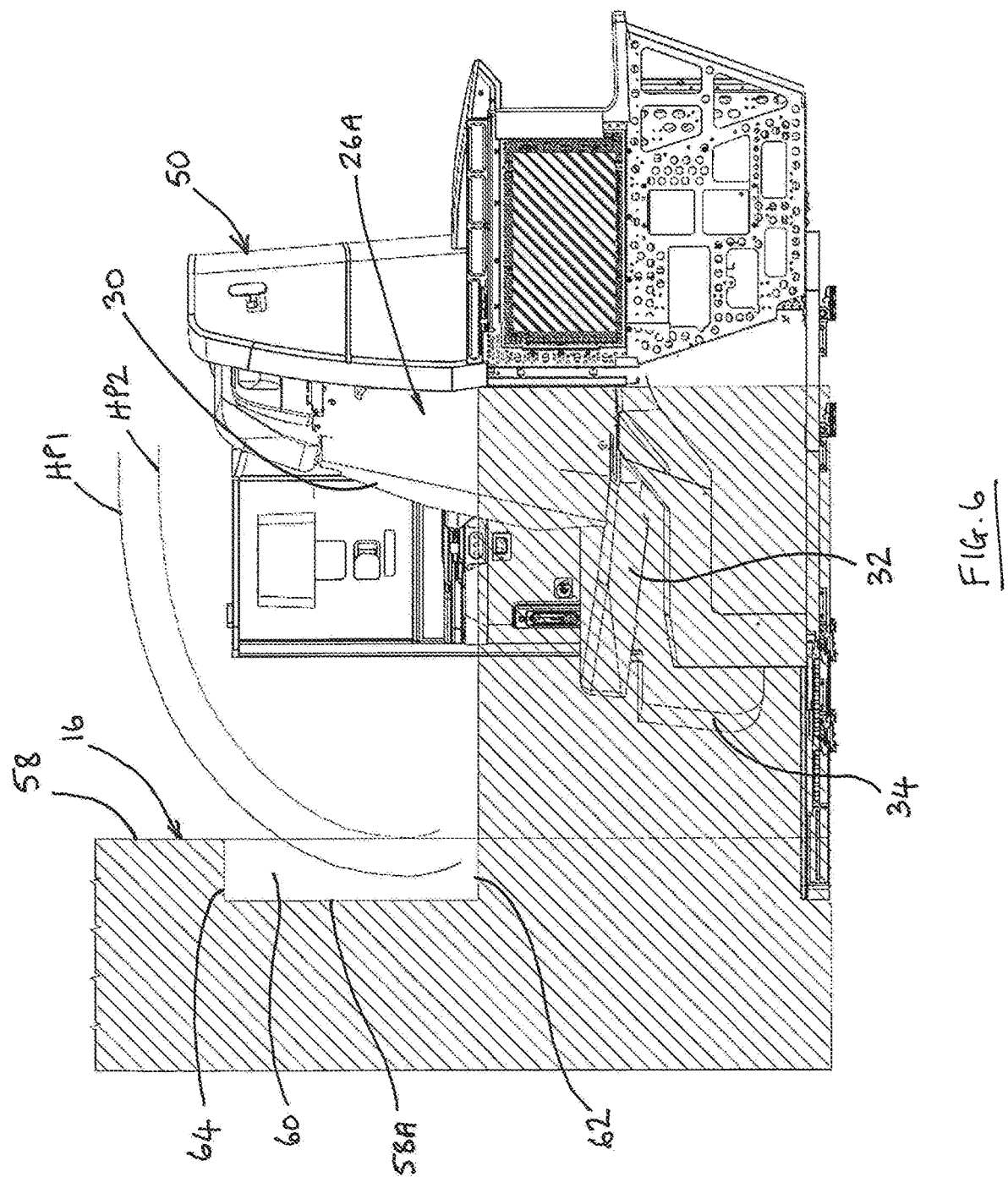

PASSENGER SEATING WITH FRONT ROW BULKHEAD INTEGRATION

RELATED APPLICATIONS

This application claims the benefit of priority under 35 U.S.C. § 119 to GB Application No. 2109582.3, filed Jul. 2, 2021, which is incorporated herein by reference in its entirety.

FIELD OF THE INVENTION

The present invention relates to passenger seating. The invention relates particularly, but not exclusively to aircraft passenger seating.

BACKGROUND TO THE INVENTION

For passenger-carrying vehicles, such as aircraft, it is desirable to maximize the number of passenger seats in a seating area in order to maximize revenue. However, competing considerations include passenger comfort and passenger safety. For example, for premium seating it is usually necessary to provide enough space for each seat to recline into a bed, as well as providing space around the seat to accommodate a console(s), a monitor, a tray, a foot well and so on. With regard to safety, it is necessary to provide enough head space around a seated passenger to minimize the chance that the passenger's head will hit a nearby surface in the event of an accident.

It would be desirable to mitigate the problems outlined above.

SUMMARY OF THE INVENTION

From a first aspect the invention provides a passenger seating installation for a vehicle, the seating installation comprising:
a bulkhead having an obverse face;
at least a first seat located adjacent the obverse face of said bulkhead,
wherein said first seat faces in a first direction that is obliquely disposed to a direction of travel of said vehicle, and said bulkhead is spaced apart from said first seat in the direction of travel,
and wherein said obverse face is shaped to define a recess for receiving the head of a passenger in said first seat in the event of an accident, said recess being spaced apart from said first seat in the direction of travel and in a direction that is obliquely disposed with respect to said first direction.

Preferably, said recess is aligned with at least one predicted head path of said passenger in the direction of travel.

Preferably, said recess is configured to coincide with an end portion of a head space for said passenger, wherein said head space is defined by at least one predicted head path of the passenger.

Preferably, said recess is configured so that said end portion of said head space is located within said recess.

Preferably, said bulkhead overlaps with said head space in the direction of travel only in the space defined by said recess.

Preferably, said recess is shaped, dimensioned and positioned to coincide with an end portion of a head space, preferably such that said end portion of said head space is located within said recess.

Preferably, said recess is shaped and dimensioned to match, or substantially match, the shape and size of said end portion of the head space.

Preferably, the recess is aligned with an axis that extends from the first seat, preferably when the first seat is in an upright state, in the direction of travel, the axis preferably extending from a reference point of the first seat, the reference point preferably corresponding with a head and/or torso of a passenger seated in said first seat, in particular when the seat is in the upright state.

Preferably, in a lateral or transverse direction and in a vertical direction, the recess is located such that it is aligned with the first seat, preferably when the first seat is in an upright state, preferably such that it is aligned with a head and/or torso of a passenger seated in said first seat, in particular when the seat is in the upright state.

Typically, a bottom of the recess is higher than a seat pan of said first seat when in an upright state.

Typically, a top of the recess is at or below a top of said first seat when in an upright state.

Typically, in a lateral or transverse direction perpendicular to the direction of travel, said recess does not extend beyond either side of said first seat when in an upright state.

In preferred embodiments, the bulkhead is shaped to define a foot well for the first seat, the foot well preferably opening onto the obverse face of the bulkhead, and wherein, preferably, the foot well is shaped and dimensioned to receive a foot rest of the first seat when the first seat is in a reclined state, preferably when said first seat is reclined to form a bed, and wherein, optionally, the foot well includes a platform for receiving the passenger's feet.

Preferably, the foot well is aligned with, and located forward of, the first seat in said first direction.

Preferably, the foot well is laterally spaced from the recess in a direction perpendicular to said direction of travel.

In preferred embodiments, a monitor or video display device is mounted on the obverse face of bulkhead, and is preferably movable into and out of a deployed state in which it faces the first seat.

Preferably, in a stowed state said monitor or video display device is laterally spaced apart from said recess in a direction perpendicular to said direction of travel.

Preferably, said monitor or video display device is located above said foot well.

Typically, the obverse face of said bulkhead extends perpendicularly to the direction of travel.

In preferred embodiments, said bulkhead comprises a monument, especially an aircraft monument, wherein said monument may be configured to provide one or more compartment for storage and/or one or more compartment for housing equipment or sanitary ware, or for providing a lavatory or galley.

Typically, said first seat is a front seat of a column of seats, wherein said column extends in a fore-and-aft direction aligned with said direction of travel, and wherein, preferably, each seat in said column faces in said first direction.

Typically, the or each seat is located in a respective passenger accommodation zone defined by one or more structures around the seat, wherein said passenger accommodation zone includes a doorway for providing access between said passenger accommodation zone and an aisle, wherein said aisle preferably extends in a fore-and-aft direction aligned with said direction of travel.

Optionally, said seat is located in a first part of said passenger accommodation zone, said first part having a central axis that extends in said first direction, and said doorway is located in a second part of said passenger accommodation zone, said second part having a central axis that is perpendicular to said fore-and-aft direction and oblique to said first direction.

Preferably, each seat in the column, and/or the respective passenger accommodation zone of each seat, overlaps with the, or each, adjacent seat, and/or the respective passenger accommodation zone of each adjacent seat, in said fore-and-aft direction, and wherein, optionally, each passenger accommodation zone includes a console and a foot well, wherein the foot well of any one of said seats other than said first seat is provided beneath the console of an adjacent forward seat.

From a second aspect, the invention provides a vehicle, preferably an aircraft, comprising at least one seating installation of the first aspect of the invention. Said at least one seating installation may be located adjacent at least one aisle, said at least one aisle preferably extending in a fore-and-aft direction aligned with said direction of travel, and wherein preferably said bulkhead extends perpendicularly to said aisle.

In preferred embodiments, the passenger seating installation for a vehicle comprises a front seat located adjacent a bulkhead and facing in a direction that is oblique to the direction of travel of the vehicle. The bulkhead includes a recess for receiving the head of a passenger in the front seat in the event of an accident. The recess is spaced apart from the front seat in the direction of travel and in a direction that is obliquely disposed with respect to the direction in which the seated passenger faces. The recess allows the front seat to be located closer to the bulkhead than would be the case in the absence of the recess, which can increase seat density in a seating area.

Other advantageous aspects of the invention will be apparent to those ordinarily skilled in the art upon review of the accompanying description of a specific embodiment and with reference to the accompanying drawings.

BRIEF DESCRIPTION OF THE DRAWINGS

An embodiment of the invention is now described by way of example and with reference to the accompanying drawings in which:

FIG. 6 is a side view of the seating installation of FIGS. 1 to 5.

DETAILED DESCRIPTION OF THE DRAWINGS

Figure 1:
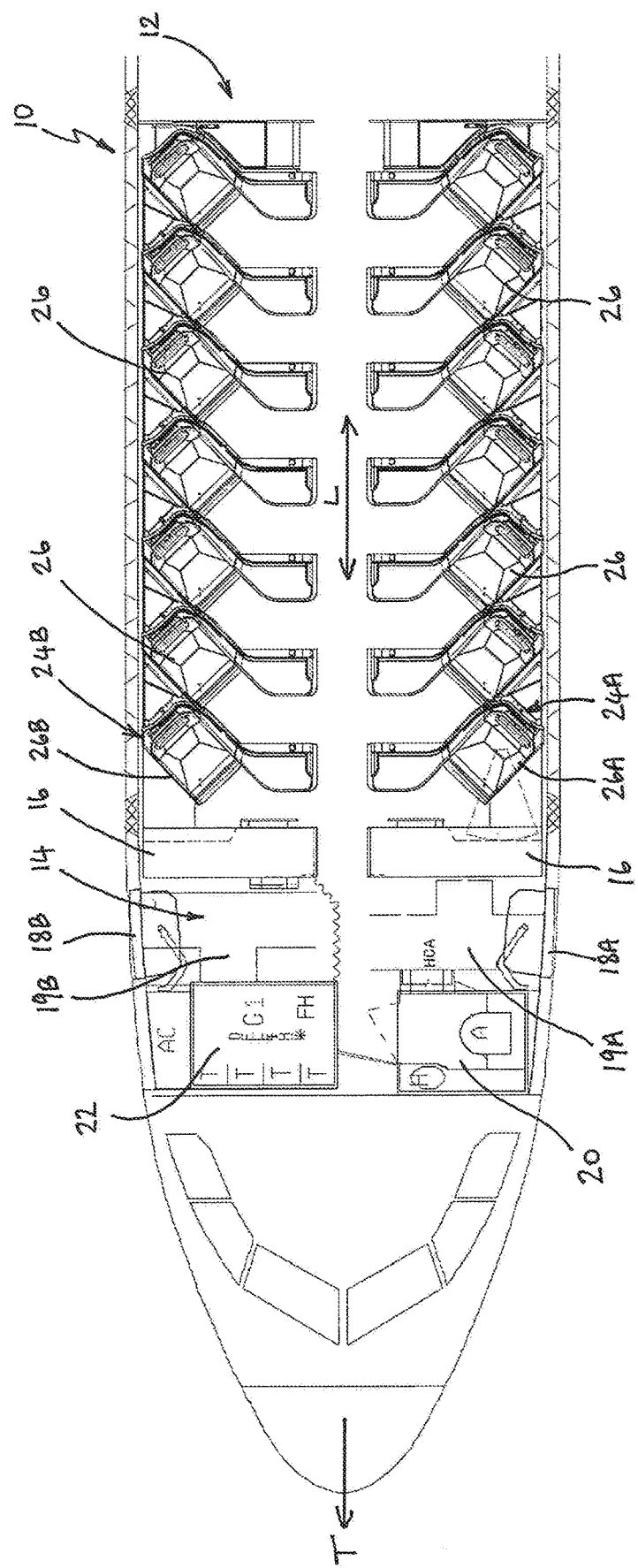
FIG. 1 is a plan view of part of an aircraft cabin embodying one aspect of the invention, and including a seating installation embodying another aspect of the invention.

Referring now to the drawings there is shown, generally indicated as 10, part of a fuselage of an aircraft, the fuselage 10 containing a passenger cabin 12 separated from an adjacent interior zone 14 of the aircraft by bulkheads 16, which may comprise a respective monument. The adjacent interior zone 14 may for example comprise one more galley, storage area, lavatory and/or passage depending on the configuration of the aircraft. In the illustrated example, one side of the zone 14 comprises an exterior door 18A and associated passage 19A, and a lavatory 20, while the other side comprises an exterior door 18B and associated passage 19B, and a storage unit 22.

At least one passenger seating installation 24A, 24B embodying one aspect of the invention is provided in the cabin 12. FIG. 1 shows a preferred embodiment in which there are two instances 24A, 24B of the seating installation, separated by an aisle 25. In alternative embodiments (not illustrated) there may be only one instance of the passenger seating installation, or there may be more than two instances, and there may be more than one aisle, either of which may depend on the size and/or desired configuration of the aircraft. The cabin 12 has a longitudinal direction L, commonly referred to as the fore-and-aft direction, and the, or each, aisle typically runs in the longitudinal direction L. The direction of travel T of the aircraft is aligned with the longitudinal direction L and is in the "fore" direction, i.e. right-to left as viewed in FIGS. 1 and 2. Each seating installation 24A, 24B typically comprises a plurality of seats 26 usually arranged in a column that extends in the longitudinal direction L. The seats 26 of each seating installation 24A, 24B may be provided in one or more row, each row comprising one or more seats 26. Each row typically runs transversely of the cabin 12, i.e. perpendicularly or obliquely to the longitudinal direction L, but may alternatively run obliquely with respect to the longitudinal direction L. In the illustrated embodiment, each row comprises a single seat 26A 26B. In embodiments, where the row(s) and/or column(s) have more than one seat 26, the seats 26 are typically the same, or substantially the same, as each other, and are typically oriented in the same or similar manner.

Figure 2:
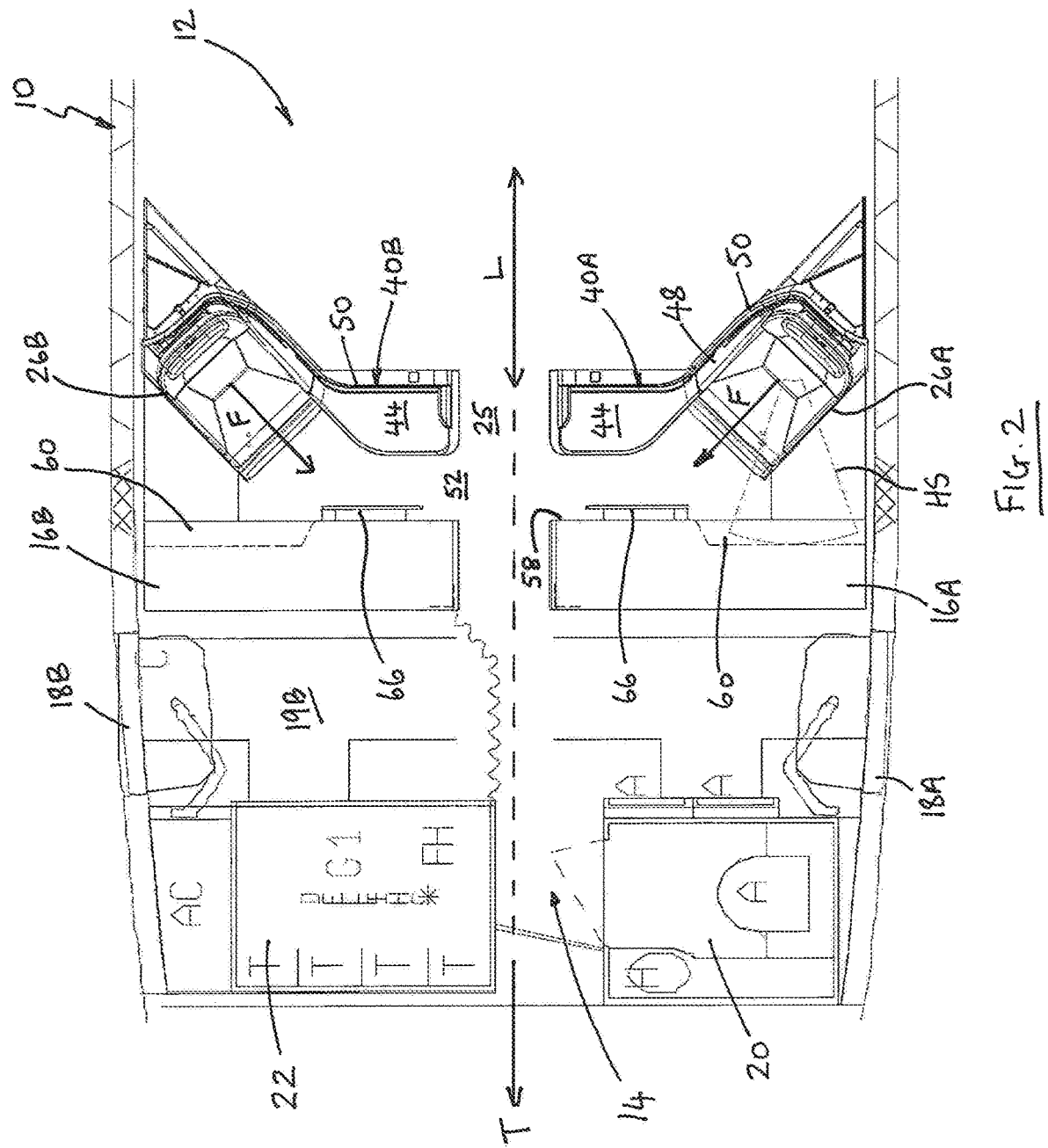
FIG. 2 is an enlarged plan view of part of the aircraft cabin of FIG. 1.

In FIG. 2, only one seat 26A, 26B of each seating installation 24A, 24B is shown. In particular, the seat 26A, 26B is a front seat that is located adjacent the respective bulkhead 16A, 16B. Each seat 26 faces in a direction F, the direction F therefore also being the direction in which a passenger (not shown in FIGS. 1 and 2) faces when seated. In the illustrated embodiment, the direction F is a forward direction in the sense that it is generally or partly in the direction of (forward) travel T of the aircraft, i.e. in the "fore" direction of the fore-and-aft direction L. As such, a seated passenger faces generally forwards in the aircraft. In alternative embodiments (not illustrated), the direction F may be a rearward direction in the sense that it is generally or partly in the opposite direction to the direction of travel T of the aircraft, i.e. in the "aft" direction of the fore-and-aft direction L. As such, a seated passenger faces generally rearward in the aircraft.

In preferred embodiments, the direction F is obliquely disposed to the longitudinal direction L, or longitudinal axis, of the cabin 12. For example, the direction F may be at an angle of between 30° and 60° (inclusive) to the longitudinal direction L although smaller or larger angles may be implemented depending on the requirements of the application. In the illustrated embodiment, the direction F extends inward of the cabin 12 (towards the aisle 25 in this example) in a generally forward direction that is oblique to the fore-and-aft direction L. Alternatively, the direction F may extend inward of the cabin 12 (e.g. towards the aisle 25) in a generally rearward direction that is oblique to the fore-and-aft direction, or outwardly of the cabin 12 (e.g. towards the cabin wall or fuselage) in a generally forward direction that is oblique to the fore-and-aft direction L, or outwardly of the cabin 12 (e.g. towards the cabin wall or fuselage) in a generally rearward direction that is oblique to the fore-and-aft direction L.

In the illustrated embodiment, the first and second instances of the seating arrangement 24A, 24B are located on opposite sides of the aisle 25, and the respective direction F of the seating arrangements 24A, 24B extends obliquely towards the aisle 25 in a generally forward direction.

More generally, the cabin 12 may be a single aisle cabin, or a multi-aisle cabin in which one or more seating installations embodying the invention may be located between any aisle and the fuselage, or other vehicle body structure, or between any two aisles, and may be oriented such that their respective direction F extends obliquely away from or towards an aisle, or away from or towards an outer boundary such as the fuselage, and/or forwardly or rearwardly of the aircraft or other vehicle. Different instances of the seating installation may be oriented in different directions within the same cabin. The actual orientation and arrangement of the seating arrangement(s) in any given cabin may depend on the size of the cabin and/or on the requirements of the aircraft operator. Moreover, while the invention is particularly suited for use with aircraft, the invention may alternatively be embodied in the context of other passenger-carrying vehicles, e.g. trains, buses or boats.

In preferred embodiments, each seat 26 is operable between an upright state (as illustrated) and a reclined state (not illustrated). It is further preferred that in a fully reclined position of the reclined state the seat 26 forms a bed. By way of example, FIG. 6 shows the seat 26A in its upright state with its back rest 30, seat pan 32 and foot rest 34 in an upright configuration for supporting a passenger in a seated position. In the fully reclined position the back rest 30, seat pan 32 and foot rest 34 adopt a reclined configuration in which they provide a flat or substantially flat surface (which may be parallel or substantially parallel with the floor of the cabin 12) that serves as a bed. The seat may be configurable to adopt other reclined positions between the upright state and the fully reclined position. The seat 26 may be articulated in any convenient manner to allow it to operate between the upright and reclined states. The seat 26 may be actuated using any convenient actuation means (not shown) for moving the seat 26 between the upright and reclined states. In the illustrated embodiment, the seat 26 moves forwards when reclining and moves rearwards when moving to the upright state.

Typically, each seat 26 is in a provided a passenger accommodation zone 40A, 40B that includes one or more structures, utilities and/or other features for use by a respective passenger. In the illustrated embodiment, each passenger accommodation zone 40A, 40B contains a single seat 26A, 26B, but in alternative embodiments, each passenger accommodation zone may include more than one seat 26. In preferred embodiments, the passenger accommodation zone 40A, 40B includes a foot well 42 for each seat 26. The foot well 42 is located forward of the respective seat 26 in the direction F, and is typically aligned with the respective seat in the direction F. Preferably, when the seat 26 is in its reclined state, especially when fully reclined to form a bed, at least part of the foot rest 34 extends into the foot well 42. Optionally, the foot well 42 contains a platform 45 for receiving the passenger's feet, especially when lying on the fully reclined seat 26. The arrangement may be such that, when the seat 26 is in its fully reclined position, the platform 45 serves as an extension of the bed provided by the seat 26.

The passenger accommodation zone 40 typically includes any one or more of the following: one or more console 44; one or more table (not shown), which may be fixed or deployable; one or more arm rest 46; one or more monitor 48, which may be fixed or deployable; one or more passenger control unit (PCU).

In preferred embodiments, the seating installation 24 includes a seat surround structure 50 for each seat 25. The seat surround structure 50 may comprise one or more wall, divider, partition and/or other structure, preferably arranged to provide privacy for the respective passenger. The seat surround structure 50 typically defines at least part of the boundary of the respective passenger accommodation zone 40.

In preferred embodiments, a respective doorway 52 provides access between the aisle 25 and the respective accommodation zone 40. A respective door (not visible) may be provided for opening and closing the doorway 52. In the illustrated embodiment, the door is part of a door assembly 54 that includes a housing 56 for housing the door when the doorway 52 is open (as illustrated), and from which the door may be deployed (typically in a linear manner by means of one or more sliding mechanism) in order to close the doorway 52. The door assembly 54 may be part of, or integrated with, the respective surround structure 50. Preferably, the doorway 52 is aligned with the aisle 25, i.e. is disposed in a plane that is parallel or substantially parallel with the longitudinal direction L. As a result, the accommodation zone 40 for each seat 26 has a non-linear central axis when viewed in plan (as can best be seen from FIGS. 2 and 5). In particular, the part of the accommodation zone 40 that contains the seat 26 has a central axis that extends in the direction F, while the part of the accommodation zone 40 adjacent the doorway 52 has a central axis that extends perpendicularly to the longitudinal direction L.

Figure 3:
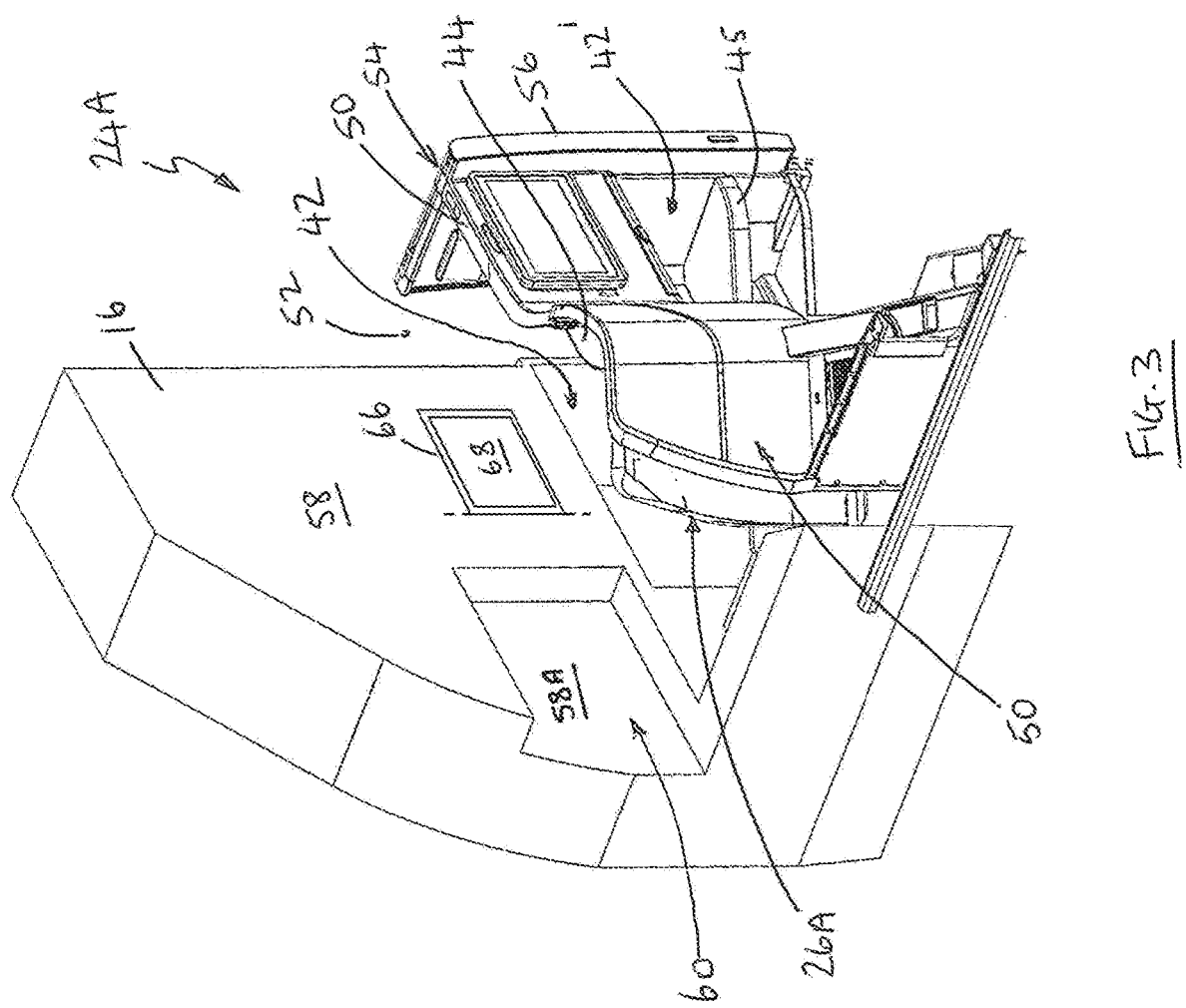
FIG. 3 is a perspective view of the seating installation of FIGS. 1 and 2.
Figure 4:
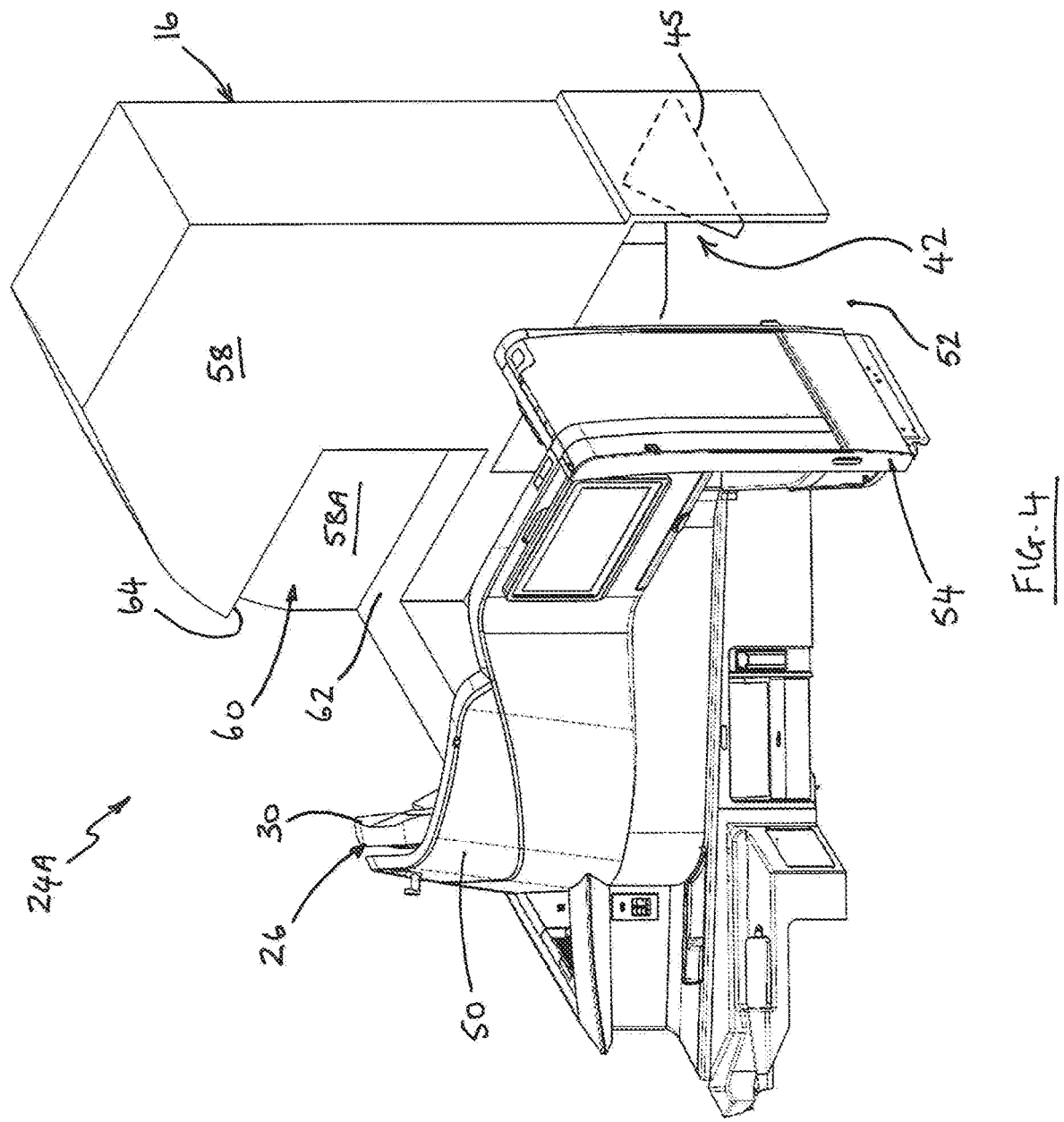
FIG. 4 is an alternative perspective view of the seating installation of FIGS. 1 and 2.

When a plurality of the seats 26, with their associated passenger accommodation zone 40, are arranged in a column that extends along the cabin 12 in direction L, the oblique orientation of the seats 26 with respect to the aisle L facilitates using a relatively small pitch (in the direction L) between adjacent seats in the column in comparison with alternative arrangements in which the seats face parallel with or perpendicular to the direction L, while providing sufficient room for passenger comfort and meeting industry requirements, e.g. for the width of the doorway 52. The relatively small pitch increases the seat density, i.e. the number of seats that can be installed in a given cabin area. In preferred embodiments, the relatively small pitch between adjacent seats 26 in the column is facilitated by overlapping adjacent seats and/or their respective accommodation zone 40 at least in the longitudinal direction L. For example, it can be seen from FIG. 1 that adjacent seats 16 in the column that at least the adjacent armrests, and optionally part of the seat pans, of adjacent seats 16 overlap. Advantageously, the foot well 42 of a given seat 26 is provided beneath the console 44 of the seat 26 in front, which facilitates the reduced inter-seat pitch (see for example FIG. 3 from which it can be seen that the foot well 42' of the seat (not shown in FIG. 3) adjacent the front seat 26 is provided underneath the console 44 of the front seat 26). This arrangement is facilitated by the non-linear central axis of the accommodation zone 40.

However, the advantages of overlapping adjacent seats does not apply to the front seat of the column since there is no seat in front of it. Instead, the front seat 26 is adjacent the bulkhead 16 which is typically disposed perpendicularly to the longitudinal direction L. However, the oblique orientation of the front seat 26 causes a seated passenger's head to be closer to the bulkhead 16 than it would be if the seat 26 faced in the direction L. Industry standards require that there is sufficient distance between a seated passenger's head and the bulkhead 16 such that her or his head does not hit the bulkhead 16 in the event of an accident. It is therefore usual to ensure that there is a sufficient distance between a front seat and a bulkhead or monument to prevent a head collision. However, depending on the relative dimensions of the cabin 12 and accommodation zone 40, the required spacing between the front seat and the bulkhead can reduce the number of seats that can be fitted into the respective column of seats. Even if this results in only one less seat in the column, the resulting loss of revenue to the aircraft operator over the lifetime of the aircraft can be significant. Advantageously, embodiments of the invention allow the front seat 26 to be located closer to the bulkhead 16 that is conventionally achieved in order to maximize the number of seats 16 that can fit longitudinally into the cabin 12, as is described in more detail hereinafter.

In preferred embodiments, the bulkhead 16 comprises a monument. For example, in the illustrated embodiment, the bulkhead 16 comprises a monument, which may be self-supporting (e.g. not supported by an adjacent support structure) and/or a stand-alone unit, or may be supported by an adjacent support structure (not shown). The monument 16 itself may serve as a bulkhead (in which case there may be no additional support structure or bulkhead structure), or the monument 16 may be located adjacent, and optionally supported by, an adjacent bulkhead structure (not shown), or may be integrally formed with another bulkhead structure. The monument 16 may for example be a storage monument, a galley monument and/or a lavatory monument. In any event, the bulkhead 16 is typically configured to provide one or more compartment (not visible), e.g. for storage and/or for receiving equipment or sanitary ware. Each bulkhead 16A, 16B has an obverse face 58 that faces the respective front seat 26A, 26B. Typically, the obverse face 58 is planar, or substantially planar. The bulkhead 16, in particular the obverse face 58, is typically upright, i.e. wall-like. The bulkhead 16 usually extends transversely of the cabin 12. Typically, the obverse face 58 is disposed, or substantially disposed, in a plane that is perpendicular, or substantially perpendicular to the fore-and-aft direction L, and therefore to the direction of travel T. The direction F in which the respective front seat 26A, 26B faces is oblique with respect to the respective bulkhead 16A, 16B, and more particularly with respect to the obverse face 58 of the bulkhead 16A, 16B.

In a conventional arrangement in which a passenger faces in the same direction as the direction of travel, the head path of the passenger (i.e. the path along which the passenger's head would travel in the event of an accident) is in the same direction as the passenger faces. However, in preferred embodiments of the invention, because the passenger faces in direction F that is oblique to the longitudinal axis L and therefore correspondingly oblique to the direction of travel T, the head path of the passenger is obliquely disposed to the direction in which he or she faces when seated; in particular, the head path is in the direction of travel T, or at least has a central or main axis that is aligned with the direction of travel T.

Figure 5:
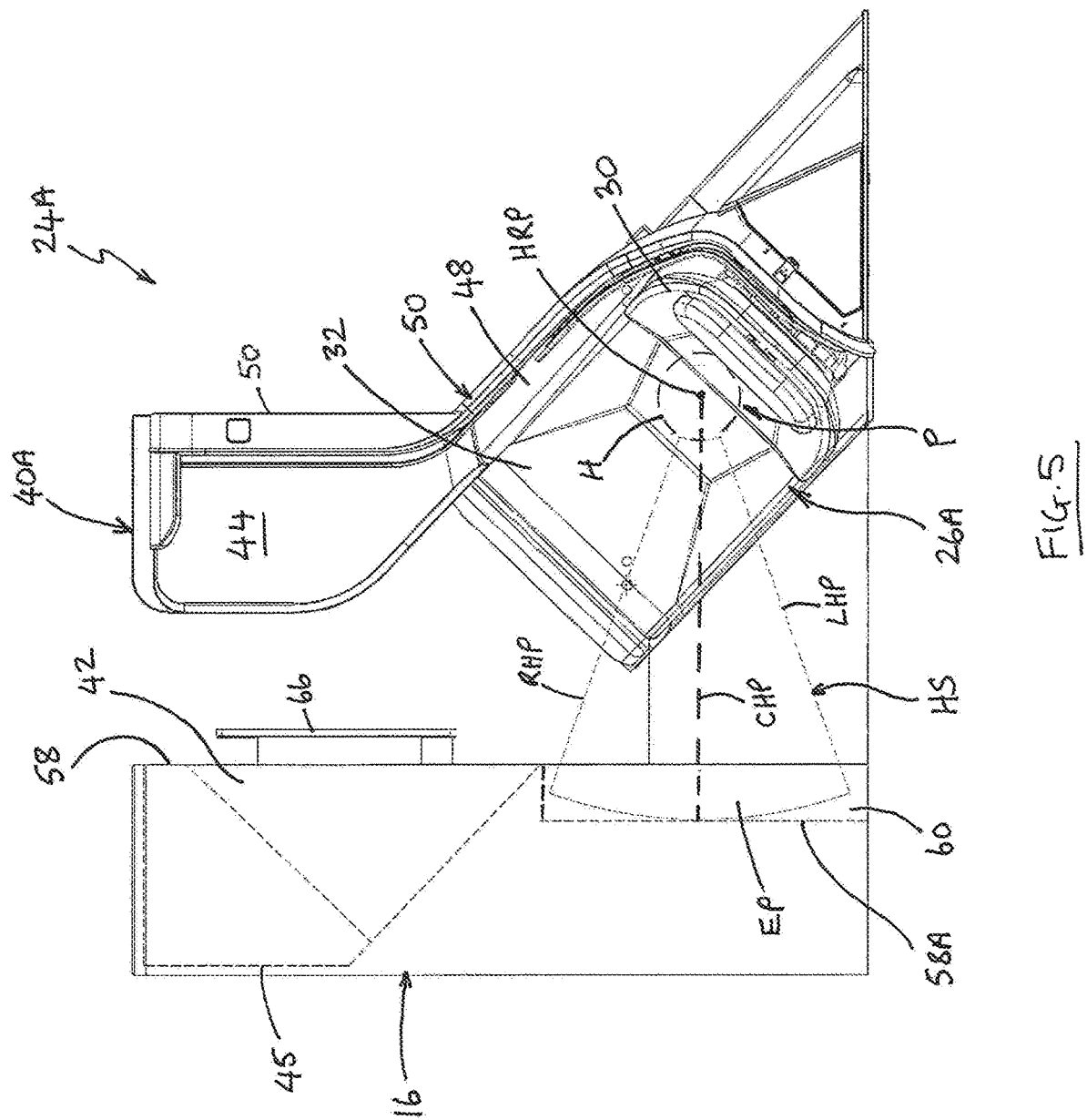
FIG. 5 is a plan view of the seating installation of FIGS. 1 to 4.

FIG. 5 illustrates in plan view a head space HS for a passenger P seated in the front seat 26A adjacent the bulkhead 16A. The size and shape of the head space HS is determined by a range of head paths that it is predicted that the passenger's head H may take in the event of an accident. It is assumed that direction of travel T of the aircraft is in the longitudinal direction L, and is right-to-left as shown in FIG. 5, i.e. in the "fore" direction of the fore-and-aft direction.

Hence, the seated passenger P faces in a direction that is obliquely disposed to the direction of travel T rather than being aligned with it. In the example of FIG. 5 the passenger P also faces partly or generally in the direction of travel T (i.e. towards the bulkhead 16A) but in alternative embodiments (not illustrated) may face generally away from the bulkhead 16A. The head space HS may be defined at least in part by a central head path CHP that extends from a head reference point HRP longitudinally, or in the direction of travel T. The head reference point HRP is a notional point representing the position of the seated passenger's head H. The length of the central head path CHP may be determined empirically by testing, preferably taking into account a range of passenger sizes. By way of example, the length of the central head path CHP may typically be between 750 mm to 950 mm. In the illustrated example, the length of the central head path CHP is approximately 845 mm. The head space HS may be further defined laterally by a left boundary head path LHP and a right boundary head path RHP which are located to the left and right of the central head path CHP respectively. The length and direction of the left and right head paths LHP, RHP may be determined empirically by testing, preferably taking into account a range of passenger sizes. In the illustrated example, the left and right head paths LHP, RHP extend from the head reference point HRP at an angle of 20° in the azimuth plane with respect to the central head path CHP, although the angle may be larger or smaller (e.g. 10°) depending on the embodiment. The upper and lower boundaries of the head space HS may also be determined empirically by testing. The central head path CHP may be used to define the upper boundary since the passenger's head H tends to move downwards in the event of an accident. This is illustrated in FIG. 6 which shows, by way of example, in side view first and second head paths HP1, HP2, which in this example represent the $95^{th}$ percentile of passengers and the $50^{th}$ percentile of passengers respectively, and which may be determined empirically by testing. It will be seen that the head path HP1 allows a lower boundary for the head space HS to be determined. In this example, the lower boundary is 718.6 mm above the base of the seat 26A, although this value may change from embodiment to embodiment.

It will be apparent from the forgoing that a volumetric head space HS for a seated passenger may be determined based on at least one predicted head path in the event of an accident. Because the seat 26 faces in a direction F that is oblique to the direction of travel, the head space HS extends from the head reference point HRP in a forward direction (i.e. in the direction of travel T) that is oblique to the direction F in which the seated passenger faces. The head space HS typically has a main or directional axis (which may be represented by the central head path CHP in FIG. 5) which extends in the longitudinal direction L, or the direction of travel T, or at least in a plane that is parallel with the plane of the longitudinal direction L or the direction of travel T. The size and shape of the head space HS may be determined empirically by testing and/or by calculation as is convenient. The illustrated example shows the seat 26A facing generally forwards or towards the bulkhead 16. In alternative embodiments, however, the front seat may face generally rearwards or away from the bulkhead 16 and the same or similar description in relation to the head space HS applies because the front seat still faces in a direction F that is oblique to the direction of travel, and the head space HS extends from the head reference point HRP in a forward direction that is oblique to the direction F in which the seated passenger faces.

To avoid passenger head collisions with the bulkhead 16, the front seat 26 and the bulkhead 16 must be arranged such that the bulkhead 16 does not impinge on the head space HS. This may be achieved by locating the front seat 26 sufficiently far from the obverse face 58 of the bulkhead 16 that there is no overlap between the head space HS and the bulkhead 16 in the longitudinal direction L. However, as outlined above, it is desirable to minimize the distance between the front seat 26 and the bulkhead 16 in order to increase seat density in the cabin 12. To this end, the bulkhead 16 is shaped to define a recess 60. The recess 60 is aligned with the head space HS and the front seat 16 is spaced apart from the bulkhead 16 at a distance such that an end portion EP of the head space HS (i.e. a portion that is distal the head reference point HRP) is located in the recess 60, and preferably does not extend beyond the recess 60. As such, the bulkhead 16 and the head space HS overlap in the longitudinal direction, but only in the space defined by the recess 60. In preferred embodiments, the recess 60 is formed in the obverse face 58 of the bulkhead. Typically, the recess 60 is spaced apart from the front seat 26 (in particular when the seat 26 is in its upright state) in the direction of travel T (or in the fore direction of the fore-and-aft direction L) and in a direction that is obliquely disposed with respect to the direction F in which a seated passenger faces (whether the direction F is oriented towards or away from the bulkhead 16). Preferably, the recess 60 is aligned with an axis (e.g. the axis CHP) that extends from the seat 26 (in particular when the seat 26 is in its upright state) in the direction of travel T. The axis may extend from any suitable reference point of the seat 26, preferably a reference point that corresponds with a seated passenger's head and/or torso (in particular when the seat 26 is in its upright state), e.g. the HRP. Preferably, in the transverse, or lateral, direction, and in the vertical direction, the recess 60 is located such that it is aligned with the seat 26 (in particular when the seat 26 is in its upright state), in particular such that it is aligned with a seated passenger's head and/or torso.

Accommodating the end portion EP of the head space HS in the recess 60 allows the seat 26 to be located closer to the bulkhead 16 than would be the case in the absence of the recess 60. The depth of the recess 60 depends on the longitudinal distance of the seat 26 from the bulkhead 16 and the maximum length of the head space HS in the longitudinal direction and may vary from embodiment to embodiment.

It is preferred that the recess 60 is shaped and dimensioned to match or substantially match the end portion EP of the head space HS. This is particularly advantageous in embodiments where the bulkhead comprises a monument, since minimizing the space defined by the recess 60 maximizes the space that remains for the monument's primary utility, e.g. storage. In preferred embodiments therefore the recess 60 does not extend to the ceiling or to the floor of the cabin, nor does it extend across the whole width of the bulkhead 16. Typically, the bottom 62 of the recess 60 is at a level that is above the level of the seat pan 32 when the seat 26 is upright. Typically, the top 64 of the recess 60 is at a level that is at or below the level of the top of the seat 26 (e.g. the top of the head rest) when the seat 26 is in its upright state. In the lateral direction, i.e. parallel with the cabin floor, it is preferred that the recess 60 does not extend beyond the boundaries of the seat 26 when the seat is upright. In the illustrated embodiment, the recess 60 is substantially cuboid in shape, but may take any shape, regular or irregular, that suits the application. For example, the recess 60 may be formed by providing the bulkhead with a recessed face 58A that is offset, or recessed, with respect to the obverse face 58, and which may be parallel or substantially parallel with the obverse face 58.

In preferred embodiments, the bulkhead 16 is shaped to define the foot well 42 for the front seat 26. The foot well 42 may be formed as a recess that opens onto the obverse face 58 of the bulkhead 16. In preferred embodiments, the foot well 42 is shaped and dimensioned to receive the foot rest 34 of the front seat 26 when the front seat 26 is reclined, in particular when it is reclined to form a bed. The foot well may include a platform 45 for receiving the passenger's feet, especially when lying on the fully reclined seat 26. The preferred arrangement is such that, when the seat 26 is in its fully reclined position, the platform 45 serves as an extension of the bed provided by the seat 26. To this end, the configuration may be such that the foot rest 34 is contiguous or substantially contiguous with the platform 45 when the seat 26 is fully reclined to form a bed. Preferably, the foot well 42 is aligned with, and located forward of, the front seat 26 in the direction F. In preferred embodiments, the foot well 42 is laterally spaced from the recess 60 in a direction perpendicular to the longitudinal direction L. Typically, the recess 60 is located higher in the bulkhead 16 than the foot well 42.

In preferred embodiments, a monitor 66 or other video display device is mounted on the bulkhead 16, preferably on the obverse face 58. Advantageously, the monitor 66 is deployable between a stowed state (as illustrated) and a deployed state in which the monitor's screen 68 faces the front seat 26 for viewing by a seated passenger. In the deployed state, the monitor 66 is typically perpendicular or substantially perpendicular to the direction F. In the stowed state, the monitor 66 is retracted towards and preferably against the bulkhead 16, preferably such that its screen 68 is parallel or substantially parallel with the obverse face 58. Any suitable deployment mechanism (not shown) may be provided for moving the monitor 66 between the deployed and stowed states, the deployment mechanism typically being configured to pivot and/or rotate the monitor between the deployed and stowed states. Preferably, the monitor 66 is located above the foot well 42. Typically, the monitor 66 is located beside the recess 60, i.e. laterally spaced from the recess 60 in a direction perpendicular to the longitudinal direction L, i.e. in the transverse direction of the cabin.

Advantageously, embodiments of the invention allow a passenger seating 24A, 24B to be integrated with a respective front row monument 16A, 16B (or other bulkhead structure), in particular such that the passenger accommodation zone 40A, 40B of a front seat 26A, 26B is integrated with the monument/bulkhead 16A, 16B. As a result, the number of seats 26 that can fit into a given area, i.e. the seat density, is increased in comparison with conventional arrangements.

The invention is not limited to the embodiment(s) described herein but can be amended or modified without departing from the scope of the present invention.

The invention claimed is:
1. A vehicle comprising:
  a passenger seating installation located in a passenger cabin of said vehicle; and
  a bulkhead comprising a monument that separates said passenger cabin from an adjacent interior zone of the vehicle, the monument having an obverse face that extends perpendicularly to a fore-and-aft direction that corresponds to a direction of travel of said vehicle, wherein said passenger seating installation comprises at least a first seat located adjacent the obverse face of said monument, and wherein said first seat faces in a first direction that is obliquely disposed to said fore-and-aft direction, and said monument is spaced apart from said first seat in said fore-and-aft direction, and wherein said obverse face of said monument is shaped to define a recess for receiving the head of a passenger in said first seat in the event of an accident, said recess being spaced apart from said first seat in said fore-and-aft direction and in a direction that is obliquely disposed with respect to said first direction, and wherein said recess is shaped, dimensioned and positioned to coincide with an end portion of a head space for said passenger such that said end portion of said head space is located within said recess, said recess having a mouth opening onto the obverse face of the monument, the mouth having a top, a bottom and sides, the bottom of said mouth being higher than a seat pan of said first seat when in an upright state, said recess being shaped and dimensioned to match, or substantially match, the shape and size of said end portion of the head space, said head space being defined by at least one predicted head path of the passenger in the event of an accident.

2. The vehicle of claim 1, wherein said recess is aligned with at least one predicted head path of said passenger in the fore-and-aft direction.

3. The vehicle of claim 1, wherein said recess is configured so that said end portion of said head space is located within said recess.

4. The vehicle of claim 1, wherein said monument overlaps with said head space in the fore-and-aft direction only in the space defined by said recess.

5. The vehicle of claim 1, wherein said recess is shaped, dimensioned and positioned to coincide with said end portion of said head space such that said end portion of said head space is located within said recess, said recess being shaped and dimensioned to match, or substantially match, the shape and size of said end portion of the head space.

6. The vehicle of claim 1, wherein in a transverse direction and in a vertical direction, the recess is located such that it is aligned with the first seat such that it is aligned with a head and/or torso of a passenger seated in said first seat when the seat is in said upright state.

7. The vehicle of claim 1, wherein said top of said mouth is at or below a top of said first seat when in said upright state.

8. The vehicle of claim 1, wherein in a lateral or transverse direction perpendicular to the fore-and-aft direction, said recess does not extend beyond either side of said first seat when in said upright state.

9. The vehicle of claim 1, wherein said first seat is operable between an upright state and a reclined state, said first seat forming a bed in said reclined state, and wherein the monument is shaped to define a foot well for the first seat, the foot well being shaped and dimensioned to receive a foot rest of the first seat when the first seat is in said reclined state, and wherein the foot well is laterally spaced from the recess in a direction perpendicular to said fore-and-aft direction.

10. The vehicle of claim 1, wherein a monitor or video display device is mounted on the obverse face of monument, and is movable into and out of a deployed state in which it faces the first seat, and wherein in a stowed state said monitor or video display device is laterally spaced apart from said recess in a direction perpendicular to said fore-and-aft direction.

11. The vehicle of claim 10, wherein the monument is shaped to define a foot well for the first seat, and wherein said monitor or video display device is located above said foot well.

12. The vehicle of claim 1, wherein said monument is configured to provide one or more compartment for storage and/or one or more compartment for housing equipment or sanitary ware, and/or to provide part of a lavatory or galley.

13. The vehicle of claim 1, wherein said first seat is a front seat of a column of seats, wherein said column extends in said fore-and-aft direction.

14. The vehicle of claim 1, having an aisle extending in said fore-and-aft direction, wherein said first seat is located in a respective passenger accommodation zone defined by one or more structures around the seat, wherein said passenger accommodation zone includes a doorway for providing access between said passenger accommodation zone and said aisle.

15. The vehicle of claim 14, wherein said first seat is a front seat of a column of seats, wherein said column extends in said fore-and-aft direction, and wherein each seat in the column, and/or the respective passenger accommodation zone of each seat, overlaps with the, or each, adjacent seat, and/or the respective passenger accommodation zone of each adjacent seat, in said fore-and-aft direction.

16. The vehicle of claim 1, wherein the foot well includes a platform providing an extension of said foot rest of the first seat when the first seat is in said reclined state.

17. The vehicle of claim 1, wherein the monument is shaped to define a foot well for the first seat, and wherein said foot well has a mouth that opens onto the obverse face of the monument, wherein the mouth of the foot well and the mouth of the recess are level with each other in said fore-and-aft direction.

* * * * *